P. C. HEWITT.
APPARATUS FOR TRANSFORMING ELECTRICAL ENERGY.
APPLICATION FILED OCT. 9, 1905.
966,205.
Patented Aug. 2, 1910.
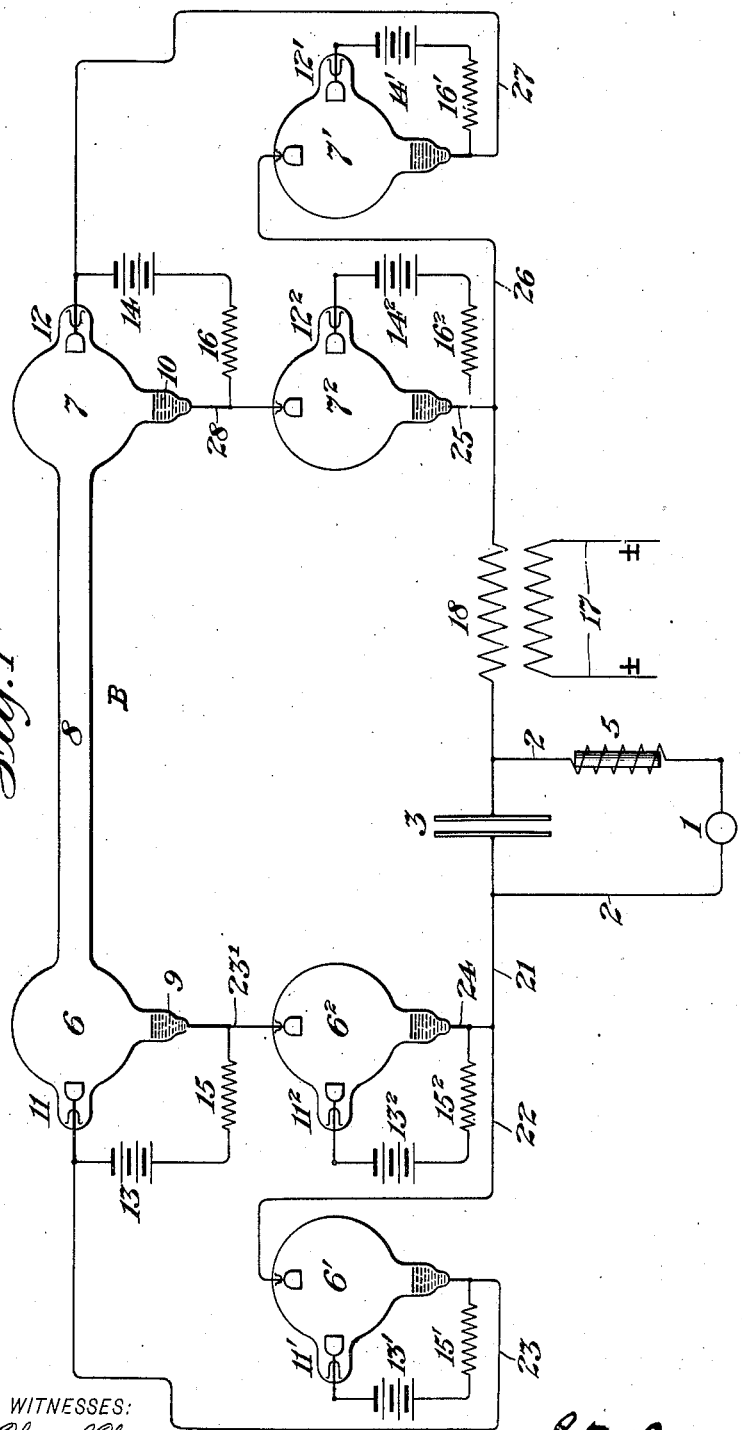
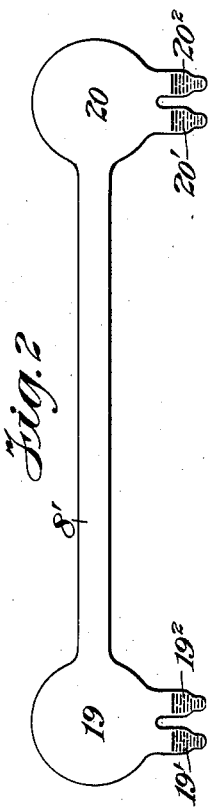
WITNESSES:
Chas. F. Clagett
Thos. H. Brown
INVENTOR
Peter Cooper Hewitt
BY his ATTORNEY
Charles A. Terry

UNITED STATES PATENT OFFICE.

PETER COOPER HEWITT, OF NEW YORK, N. Y., ASSIGNOR TO COOPER HEWITT ELECTRIC COMPANY, OF NEW YORK, N. Y., A CORPORATION OF NEW YORK.

APPARATUS FOR TRANSFORMING ELECTRICAL ENERGY.

966,205.            Specification of Letters Patent.      Patented Aug. 2, 1910.

Application filed October 9, 1905. Serial No. 281,909.

*To all whom it may concern:*

Be it known that I, PETER COOPER HEWITT, a citizen of the United States, and resident of New York city, county of New York, State of New York, have invented certain new and useful Improvements in Apparatus for Transforming Electrical Energy, of which the following is a specification.

In various of my prior applications and patents for inventions in and relating to inclosed vapor conductors I have described how such devices may be thoroughly cleansed and evacuated to produce the required qualities and characteristics of operation by conducting such operation during the process of manufacture before sealing off and then upon development of the required conditions and reactions completing the device by sealing off. I have also described that under certain conditions particularly where a condenser is bridged across the terminals of the device, when connected in circuit, its action is intermittent and the electric current impulses or oscillations can be made with the frequency desired and so rapid as to require a most delicate instrument to detect that the passage of current is not continuous. I have also described the object of the condenser as being to accumulate the electric currents during the minute period of time when the current is not passing through the intermittently acting vapor conductor device, the device acting somewhat as a discharger for the condenser producing waves or pulsations in the current flowing in its circuit. More particularly and specifically in my prior Letters Patent Nos. 780,999, 781,000, 781,603 and 781,605 granted to me on January 31, 1905, I have described and claimed this intermittent action of the devices referred to in producing oscillations or impulses of a desired frequency in a capacity circuit, thus covering the use of my inclosed vapor conductors as discharge devices or discharge gaps for condenser, capacity or other circuits wherein the function of a discharge gap is necessary or desirable.

I have shown and described the source of energy as being any convenient source for instance a continuous current generator and the discharge device as being of the character described in my patent and I have shown for purposes of illustration, a form of device in which the terminals or electrodes are dissimilar, one being a solid and the other a volatile liquid such as mercury.

In my application Ser. No. 243,217 filed January 30, 1905, the discharge device shown and claimed is the species of inclosed vapor conductor device wherein the terminals of electrodes are preferably similar in construction and in material, are preferably formed of bodies of liquid, preferably metallic, preferably volatile and preferably mercury, while the source of supply may be a direct current source or an alternating source.

In my prior application, Serial No. 264,071, filed June 7th, 1905, I have explained fully the action and advantages of the vapor column as an interrupter, and have shown, described and claimed means for practically eliminating the negative electrode factor of interruption, so as to bring into operation and effect the characteristic resistances and interrupting action of the vapor column from vapor to vapor through vapor only. In the use of this device, the effect seems to be almost entirely free from any effect of either negative or positive electrode resistances other than that of vapor. The desired result was accomplished by providing a supplemental electrode adjacent to the negative electrode of the circuit to be interrupted and making said supplemental electrode the positive electrode of an auxiliary local insulated circuit of a source of electromotive force, preferably a storage battery. The main negative electrode of the lamp I make the negative electrode of the storage battery circuit. The battery is of sufficient voltage to maintain the current through the vapor conductor between the adjacent terminals. This has the effect of maintaining the negative electrode of the circuit to be interrupted in its low resistance or operating condition, so that there is no negative electrode resistance to starting or practically none at the electrode to oppose the passage of the current to be started and interrupted. In said application, I have described an unsymmetrical form of lamp for interrupting direct current and also a symmetrical form, by making the main electrodes at each end similar, and providing each with a separate supplemental electrode and a separate continuously operating battery circuit for maintaining current flow into each negative electrode leaving the rest of the inclosure with no current passing. When both electrodes are thus made actively conducting through small portions of the vapor column respectively, the remainder of the vapor column connecting these two zones or regions of activity acts as the interrupter in accordance with its own laws of operation, and free from material complication or modification by electrode resistance phenomena, in other words, the device is in a sense, a symmetrical vapor conductor interrupter having constantly conducting vapor electrodes. This arrangement has the limitation that where the condenser is alternately charged and discharged, first one way and then the other through the interrupter, either by reason of use of alternating current source or by reason of persistent oscillation of the discharge where the source is uni-directional or alternating, the amperage of the current from the condenser must not exceed the amperage of the battery of the keep-alive circuit, for if the condenser to be discharged is of great capacity so that the current flowing therefrom is of considerable quantity, the amperage of the local circuits should be increased so as to be always larger than the maximum instantaneous value of flux of the oscillations from the condenser flowing from the negative electrode because, as will be obvious, if at any instant the flux from a negative electrode of the oscillatory circuit becomes equal to or greater than the battery flow into said electrode, the battery flow will be interrupted and will not reëstablish itself. If, however, the amperage of the condenser discharge out of the negative electrode is always small as compared with the battery flow into said electrode, the operation of the device will be continuous. Hence the necessity of carefully considering the keep-alive circuit where oscillations of large amperage are to be handled in the apparatus described herein.

As the device is adapted for use with large condensers, giving rise to currents of great amperage, and as it is expensive and otherwise undesirable to maintain a corresponding current from the batteries of the keep-alive circuits, I have invented the arrangement described herein.

This invention may be characterized as involving the vapor electrode vapor column interrupter with uni-directional electrical valves placed therein, so that the condenser discharge current, whatever its direction, will always pass out of the device in the direction of the flow of the battery current and not in a contrary direction, thus obviating the possibility of stopping the flow of the keep-alive circuit, thereby bringing into play the electrode resistance, which it is the object of the invention to eliminate. The arrangement will be more fully described in connection with the annexed drawings, in which—

Figure 1 is a diagrammatic view of the circuits of the interrupter, electric valves, etc., Fig. 2 is a view of a modification of the interrupter particularly adapted for use with this invention but which may also be used in other connections where main and supplemental electrodes are desired.

In these drawings 1 is a direct current or alternating current source supplying the circuit 2, 2. Bridged across this circuit is a condenser 3 in parallel with a discharge device B. Between the source and the condenser in series may be arranged a reactance 5, preferably an inductance coil adapted for adjustment to vary its impedance. The discharge device B comprises the two electrode chambers 6, 7 and the connecting tube 8. The electrode chambers are provided with suitable main electrodes 9 and 10 of disintegrating material preferably of mercury, and with the supplemental electrodes 11—12, which are of iron but which may be of carbon or other solid material or of mercury or other suitable liquid as shown in Fig. 2. These chambers and electrodes may be of the construction and may have substantially the characteristics of any of the devices and electrodes which I have described in my prior patents and applications and the construction may be widely varied, though it is preferable that the main electrodes 9, 10 be of mercury and that the entire structure at 6 be exactly similar to and symmetrical with that at 7.

Each main electrode is connected so as to constitute it the negative electrode of a storage battery as shown at 13 and 14. The other pole of each storage battery 13, 14 is led to the adjacent supplemental electrodes 11 and 12 respectively so completing the circuit through the vapor. Between each negative electrode and its storage battery is preferably arranged an inductance or resistance as at 15, 16. The purpose of this inductance is two-fold. By reason of its reactance it confines the condenser discharge to the electrodes 9 and 10 and by reason of its ohmic resistance serves to retard and control the flow of the current from the battery which flow would otherwise be excessive by reason of the low resistance of its circuit and also to compensate for varying resistance at the negative electrode but they are not necessary to this invention. Where the object is to accomplish nothing by means of these local batteries except the elimination of the electrode resistance from the condenser discharge circuit, a storage battery furnishing an electro-motive force of about 30 or 40 volts will be sufficient. In such case the resistance 15 should be about 10 ohms. These figures are subject to considerable variation but in practice I find that somewhere from one to three amperes is quite sufficient to maintain current flow through the electrodes 9, 11 and 10, 12 respectively thereby eliminating their opposition to the discharge of the condenser.

The abrupt variations or fluctuations of current or the oscillations where the discharge is oscillatory may be utilized for wireless telegraphy or any other similar or desired purpose for which such currents are useful by transfer to an outside circuit 17 by any suitable means as for instance a transformer having its primary 18 in series with the condenser discharge. The circuit 1, 2 may be connected around the primary 18 as well as the condenser 3 as will be obvious to those skilled in the art. The inductance 5 may be of such value as to restrain the primary current for a sufficient time to permit free discharge and if desired free oscillation of the condenser circuit 3, 9, 6, 8, 7, 10, 18 before the recharging of the condenser progresses very far.

It is not necessary that the interrupter be kept cold but it is desirable to preserve uniformity of surroundings and consequent radiation rate as the vapor density is determined by the temperature and this should be constant so that the operation of the device may be uniform. A hot or cold bath maintained at the desired temperature or a non-conducting or conducting jacket of any kind will serve this purpose.

In addition to the above mentioned variables of length and diameter of tube 8 are other variables including the volume and radiating surface of chamber 6, 7, and the amount of current normally maintained in the local circuits 10, 7, 12, 14, 16 and 9, 6, 11, 13, 15. Other things being equal the greater the amount of this current, the greater will be the density of the vapor column 8 and therefore the desirability of suitably arranging the surroundings with respect to radiation.

As has been stated above this invention enables me to predetermine and fix the interrupting voltage or resistance at any desired value within practical limits and this I conceive to be of particular advantage in maintaining prolonged oscillations of the condenser across the discharged device.

The theory advanced for adjustments of variables of this interrupter B for purposes above described are more fully explained in said prior application and the invention hereof differs therefrom in that the leads from the condenser 3 are not directly to the electrodes 9—10 but through reversely connected unidirectional discharge device $6'$ $6^2$ on the one side and $7'$ $7^2$ on the other. As each of these unidirectional discharge devices or valves would have an electrode resistance to starting which it has been the purpose of the invention to eliminate from the device B, such electrode resistance must be eliminated from them also and this is accomplished by means of keep alive battery circuits for maintaining continuous current flow into the negative electrode through supplemental electrodes after the manner of the keep alive circuits and supplemental electrodes of the interrupter B. These supplemental electrode circuits are indicated by numerals similar to those used in connection with B but provided with different exponents, those of $6'$, $6^2$, $7'$, $7^2$ being respectively from batteries $13'$, $13^2$, $12'$, $12^2$ to corresponding electrodes $11'$, $11^2$, $12'$, $12^2$ and back through the respective negative electrodes and corresponding inductances $15'$, $15^2$, $16'$, $16^2$. With this arrangement a discharge of the condenser 3 toward the left hand of the figure will pass through 21, 22, $6'$, 23 electrode 11, column 8, electrode 10 connection 28, through $7^2$, 25, 18, while a discharge in the other direction will pass through 18, 26, $7'$, 27, 12, 7, 8, 6, 9, $23'$, 24 and 21. Thus the flow of the condenser current whichever way it may discharge will be into and out of the interrupter in the same direction as the flow of current from the keep alive circuits. Thus there is never any flow out of a negative electrode in a direction contrary to the keep alive battery circuit and it is therefore possible to make the amperage of this circuit the minimum amount necessary to maintain a continuously flowing current and thus effect a continuous elimination of electrode resistance leaving the vapor column interrupter action alone in operation.

The device shown in Fig. 2 is provided with two liquid electrodes at each end, one for main electrode and the other for a supplemental electrode but this device is connected in circuit in exactly the same way as that of Fig. 1. The electrode $19'$ corresponding to 11; $19^2$ corresponding to 9; $20'$ corresponding to 10 and $20^2$ corresponding to 12.

As has been explained the amperage of condenser discharges in alternating directions and in oscillations of the circuit may by this invention be greater than the amperage of the keep alive circuits without interfering with the operation of the latter.

I claim—

1. A discharge device provided with distant electrodes and independent keep-alive circuits for passing current into said electrodes through a small portion of the vapor and means for causing discharge between the distant terminals to flow from the discharge device through the same electrode as the keep-alive current.

2. A discharge device consisting of an evacuated inclosure provided with independent means for maintaining flow of two independent currents into and out of said inclosure in regions distant from each other, in combination with means for causing a discharge in said inclosure between the distant regions of current flow and means for causing such discharge to pass from the inclosure through the respective electrodes by which said two independent currents flow out of said inclosure.

3. A symmetrical discharge device comprising an evacuated inclosure, pairs of electrodes in opposite ends thereof, independent keep-alive circuits maintaining continuous current flow across each pair of electrodes and means for causing discharges through said device to enter the inclosure through the positive electrode of one of said keep-alive circuits and to pass out through the negative electrode of the other of said keep-alive circuits.

4. A symmetrical discharge device comprising an evacuated inclosure, pairs of electrodes in opposite ends thereof and independent circuits maintaining continuous current flow across each pair of electrodes, in combination with a pair of reversely connected uni-directional discharge devices in each of the leads from the source of current to be discharged.

5. A discharge device comprising an evacuated inclosure containing vapor, pairs of adjacent electrodes therein in combination with a capacity and pairs of reversely connected unidirectional discharge devices in leads from said condenser to said electrodes, whereby the discharge in one direction will always enter said discharge device through one electrode of one pair and pass out of same through an electrode of the other pair, while discharges in the other direction will enter the device through the other electrode of the last mentioned pair and leave it through the other electrode of the first mentioned pair.

6. A discharge device comprising an evacuated inclosure, liquid electrodes at distant points therein, a supplemental electrode adjacent each liquid electrode in combination with a condenser and suitably connected electrical valves to permit passage of current to the condenser from the liquid electrodes and from the condenser through the supplemental electrodes.

7. A discharge device comprising an evacuated inclosure, liquid electrodes at distant points therein, a supplemental electrode adjacent each liquid electrode in combination with a condenser and suitably connected electrical valves to permit passage of current to the condenser from the liquid electrodes and from the condenser through the supplemental electrodes, and independent keep-alive circuits for each main and supplemental electrode connected to maintain continuous current flow from the supplemental electrode to the adjacent liquid electrode.

8. A discharge device comprising an evacuated inclosure, liquid electrodes at distant points therein, a supplemental electrode adjacent each liquid electrode in combination with a condenser and suitably connected unidirectional discharge devices to permit passage of current to the condenser from the liquid electrodes and from the condenser through the supplemental electrodes, and independent keep-alive circuits for each main and supplemental electrode connected to maintain continuous current flow from the supplemental electrode to the adjacent liquid electrode, together with similar continuous current keep-alive circuits for each of said uni-directional discharge devices.

Signed at New York, in the county of New York and State of New York this 4th day of October A. D. 1905.

PETER COOPER HEWITT.

Witnesses:
WM. H. CAPEL,
THOS. H. BROWN.